United States Patent [19]
Lide et al.

[11] Patent Number: 5,646,538
[45] Date of Patent: Jul. 8, 1997

[54] METHOD AND APPARATUS FOR FASTENER HOLE INSPECTION WITH A CAPACITIVE PROBE

[75] Inventors: Edward N. Lide, Atlanta; Samuel R. Glidewell, Marietta, both of Ga.

[73] Assignee: Measurement Systems, Inc., Marietta, Ga.

[21] Appl. No.: 487,254

[22] Filed: Jun. 13, 1995

[51] Int. Cl.⁶ .................................................. G01R 27/26
[52] U.S. Cl. ........................ 324/662; 324/688; 324/601; 73/172
[58] Field of Search .................... 324/687, 688, 324/662, 601; 73/172

[56] References Cited

U.S. PATENT DOCUMENTS

| | | |
|---|---|---|
| 4,189,203 | 2/1980 | Miller . |
| 4,814,691 | 3/1989 | Garbini et al. . |
| 4,935,700 | 6/1990 | Garbini et al. . |
| 4,996,492 | 2/1991 | Anderson .................... 324/687 |
| 5,010,658 | 4/1991 | Griffith et al. . |
| 5,021,740 | 6/1991 | Sarr et al. . |
| 5,216,819 | 6/1993 | Givler . |
| 5,293,131 | 3/1994 | Semones et al. . |
| 5,329,691 | 7/1994 | Roberts et al. . |

OTHER PUBLICATIONS

Design of Algorithms to Extract Data from Capacitance Sensors to Meausre Fastener Hole Profiles, Hammond, Joseph L. Jr., et al., IEEE Transactions on Instrumentation and Measurement, vol. 1M-32, No. 2, Jun. 1983, pp. 343-349.

Primary Examiner—Kenneth A. Wieder
Assistant Examiner—Jose M. Solis
Attorney, Agent, or Firm—Deveau, Colton & Marquis

[57] ABSTRACT

A computer-based method and apparatus for fastener hole inspection including a capacitive probe with a plurality of sensor elements, means for grounding the faster hole, and an electronics unit electrically connected to the probe for sequencially charging one of the plurality of sensor elements while applying a guard potential to the remaining sensor elements and adjacent electrical components to eliminate residual capacitances. A profile of the fastener hole is generated by evaluating, through a series resistor, the discharge waveforms of the plurality of sensor elements by converting the capacitance measurements obtained to distance measurements. A centering algorithm is employed to compensate for malalignment of the capacitive probe in the fastener hole.

6 Claims, 6 Drawing Sheets

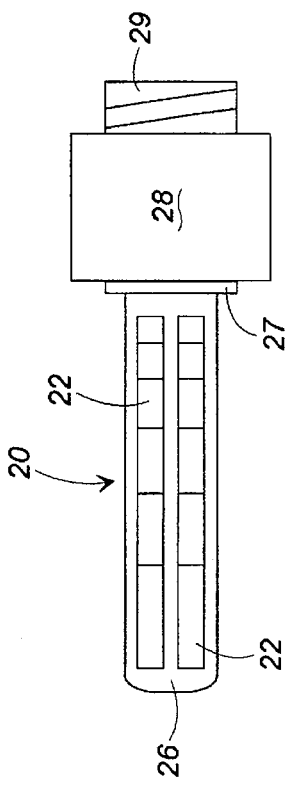
FIG. 1
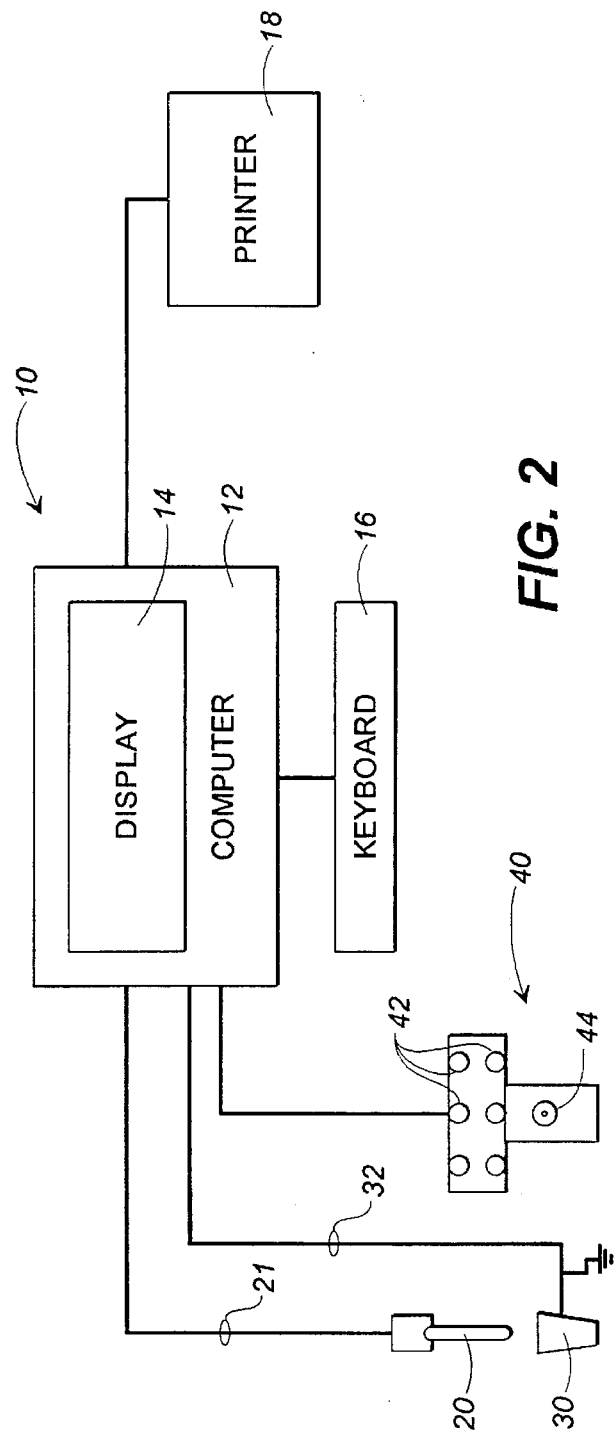
FIG. 3
FIG. 2

```
                Capacitance Measurement System II
                      Measurement Systems, Inc.
                            (c) 1993, 1994
```

Assembly 179A002    Drawing CMS-TEST    Operator cms

| RDG # | DRAWING | HOLE # | HOLE AVG | HOLE MIN | HOLE MAX | LIMIT MIN | LIMIT MAX | CONDITION |
|---|---|---|---|---|---|---|---|---|
| 15 | CMS-TEST | 15 | .2506 | .2498 | .2513 | .2480 | .2520 | GOOD |
| Level Avgs.: | | .2502 | .2506 | .2506 | .2507 | .2511 | ——— | |

READY FOR TEST

| Un-num Hole | New Holes | Air Reading | New Probe | Plot Previous | | Plot |
|---|---|---|---|---|---|---|
| Changes & Options | New Operator | New Drawing | New Assembly | Check out | Quit | |

METHOD AND APPARATUS FOR FASTENER HOLE INSPECTION WITH A CAPACITIVE PROBE

BACKGROUND OF THE INVENTION

1. Field of the Invention

This invention relates to a method and apparatus for inspecting fastener holes and, more particularly, to a system for determining the distance between a capacitive probe and the surface of a fastener hole to evaluate compliance of the fastener hole with specified dimensional standards.

2. Discussion of the Prior Art

Modern aircraft can have as many as a million or more structural fasteners including straight and tapered fasteners used on the wings of the aircraft and other structural members. The integrity of each joint joined with structural fasteners is of paramount importance to the overall reliability and safety of the aircraft and is directly related to such factors as the geometry (size, shape, diameter) and finish of the hole into which structural fasteners are inserted. These dimensional characteristics must comply with extremely rigid standards due to the effect that the mating between fasteners and fastener holes have on the strength and fatigue life of a joint. Consequently, the precise geometry, finish, and tolerance of both fasteners and fastener holes are critical. This is especially true where the structural member of the aircraft is formed of aluminum alloys which generally are susceptible to nicks from tools or other surface imperfections. Although some imperfections are permissible, dimensional standards for aircraft fastener holes generally require a tolerance of about ±0.0015". The resulting inspection and quality control requirements can be both expensive and time-consuming, especially where 100% inspection of the various dimensions of all structurally critical holes is required.

U.S. Pat. No. 5,010,658 to Griffith et al discloses a hole profile gauging system that measures the diameter of a hole at increments along its depth to provide a hole profile. The probe, comprising a split ball-type sensor, is inserted and withdrawn from the hole with measurements taken while the probe is being withdrawn. A transducer senses the separation between the split portions of the probe via a needle inserted between the split portions. By this means, any imperfections or flaws in the wall of the hole are detected by the probe and sent to a processor by the transducer. Measurements obtained are analyzed by the processor which compiles the measurements, generates a profile of the hole, and determines whether the hole is within acceptable tolerance limits. However, the method and apparatus disclosed and chimed in the '658 patent are limited to determining the profile of a cylindrical hole and would not be applicable to tapered holes typically found on aircraft parts.

Other approaches to inspection of fastener holes use a probe with several metal plates which may be energized to create a capacitance between a plate of the probe and the surface of the fastener hole. These approaches take advantage of the well known principle that for two parallel plates, the amount of electrical capacitance is proportional to the area of the plates and inversely proportional to the distance between the plates. This concept is illustrated in FIG. 1 and is embodied in the following equation: Capacitance, $C=K(A/d)$ where plate area $A=$ length $l \times$ width $w$; $d=$ separation distance; and $K=$ proportionality constant. Conductive sensing elements of the capacitive probe serve as one of the parallel plates and the grounded hole wall serves as the other plate.

U.S. Pat. No. 5,021,740 to Sarr et at. discloses a method and apparatus for measuring the distance between a body and a capacitive probe. The apparatus disclosed includes a capacitance-type sensing probe which has a plurality of measuring electrodes and a grounding electrode. The apparatus also includes a control system which comprises a selector, a converter, and a processor. The processor issues control instructions that instruct the selector to select one of the plurality of measuring electrodes. The selected electrode is coupled to the converter and forms a capacitor with a nearby grounded surface of the conductive body and thus provides an associated capacitance value to the converter. The capacitance value is then converted to a time-related signal which in mm is translated into a distance value that is substantially equal to the distance between the capacitance-type sensing probe and the surface of the conductive body. However, the method and apparatus disclosed and claimed in the '740 patent is prone to undesirable influences on the capacitance measurements such as the capacitance between the selected electrode and other electrodes or conductive components. Such residual capacitances may vary with the mere flexing of a cable and contribute significantly to the total measured capacitance. For example, residual capacitances can be on the order of several thousand picofarads making capacitance measurements in the 0.1 picofarad range unreliable. Adding to this problem is the fact that typical capacitance measuring techniques employ digital counters which sample capacitor charging or discharging times at rates of several hundred counts per picofarad requiring more complex, higher capacity, and thus, more expensive electronics to measure the higher capacitances caused by residual capacitances.

As will be appreciated from the above discussion, there exists a need in the aircraft industry for a method and apparatus that is capable of accurately and reliably measuring the distance between a capacitive probe and the surface of a fastener hole especially when very small capacitance values are involved. There is also a need for a method and apparatus for inspecting fastener holes which is fast and easy to use so that the many fastener holes can be inspected and appropriate corrective action immediately taken to fix any holes which do not comply with required dimensional standards or tolerances. It is to the provision of such a method and apparatus that the present invention is primarily directed.

SUMMARY OF THE INVENTION

In accordance with this invention, a method and apparatus for measuring and inspecting a fastener hole is provided to evaluate compliance with specified dimensional standards for the fastener hole. The fastener hole may have a surface with either a straight or tapered geometry. The apparatus comprises a generally cylindrical probe with a set of sensing elements made of several capacitor plates, a processor connected to the probe for providing control functions and manipulating data, and means associated with the processor for presenting a visual indication of whether the fastener hole inspected meets the specified dimensional standards for the fastener hole. The control functions and data manipulations provided by the processor include storing dimensional standards for the fastener hole, energizing the capacitor plates, receiving signals from the capacitor plates which represent the capacitance measured between the capacitor plates of the probe and the surface of the fastener hole adjusted for the effects of malalignment of the probe within the hole and the effects of residual capacitances so that even very small capacitances can be accurately measured, converting the capacitance measurements to distance measurements to obtain dimensional data which represents the geometry and surface of the fastener hole, and comparing the dimensional data obtained to the dimensional standards for the fastener hole. A hand control unit may be used to inform the user of the apparatus whether a given fastener hole is in compliance with the specified dimensional standards. Optionally, the processor may also include means for storing dimensional data representing the geometry and surface of the fastener hole inspected. Other optional features include a printer and an input device such as a keyboard or touch-operated screen.

The method of the present invention includes the steps of storing dimensional standards for the fastener hole; inserting a probe into the fastener hole, the probe having a set of sensing elements comprising a plurality of capacitor plates; applying a voltage to the capacitor plates; measuring the capacitance between each of the capacitor plates and the surface of the fastener hole adjacent each of the capacitor plates while adjusting for the effects of malalignment of the probe within the hole and the effects of residual capacitances so that even very small capacitances can be accurately measured; determining the distance between the capacitor plates and the surface of the fastener hole from the capacitance measurements; compiling dimensional data representing the geometry and the surface of the fastener hole from the distances determined; comparing the dimensional data to the dimensional standards for the fastener hole; and displaying a visual indication of compliance or noncompliance of the fastener hole with the specified dimensional standards.

Thus, a primary object of the present invention is to provide a method and apparatus for inspecting fastener holes which are capable of measuring very small capacitances even in the presence of relatively large and varying residual capacitances.

It is another object of the present invention to provide a method and apparatus for inspecting fastener holes which are quick and easy to use.

It is another object of the present invention to provide a fastener hole inspection system which is accurate and precise.

Still another object of the present invention to provide an apparatus for inspecting fastener holes which is small, lightweight, and portable.

Yet another object of the present invention is to provide an apparatus for inspecting fastener holes which is inexpensive.

A further object of the present invention is to provide a method and apparatus for measuring and inspecting fastener holes which include a means for permanently recording and/or plotting dimensional measurements.

These and other advantages, features, and objects of the present invention will become apparent from the following detailed description of a preferred embodiment when read in conjunction with the accompanying drawing figures.

BRIEF DESCRIPTION OF THE DRAWINGS

FIG. 1 is a diagram illustrating two parallel plates separated by a distance, d, which plates represent a plate of a capacitative probe and the surface of a fastener hole.

FIG. 2 is a block diagram of a preferred embodiment of the fastener hole inspection system of the present invention including a capacitative probe.

FIG. 3 is a more detailed graphical representation of the capacitative probe shown in FIG. 2.

DETAILED DESCRIPTION

Figure 4:
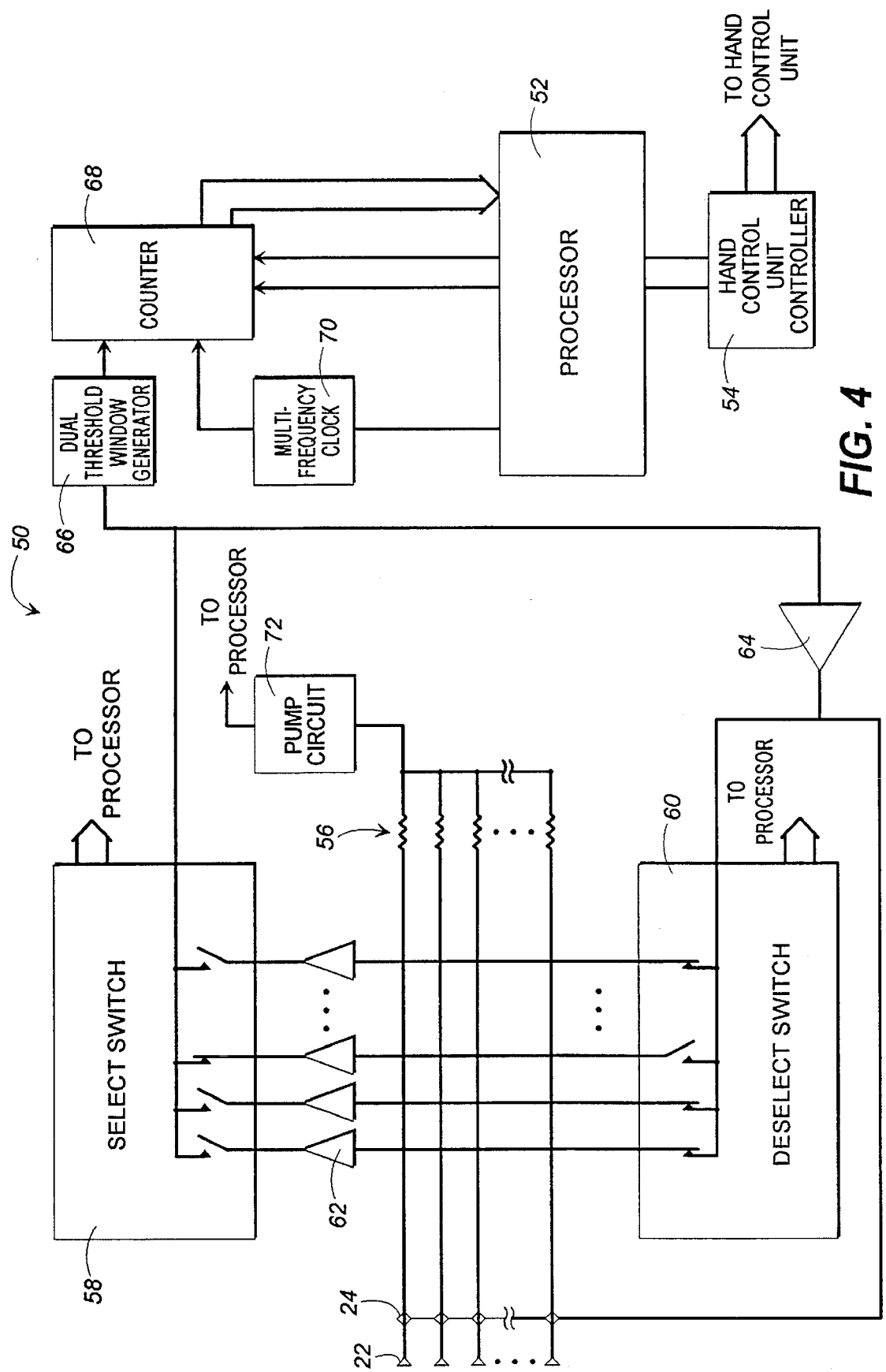
FIG. 4 is a schematic diagram of the fastener hole inspection system of the present invention.

The present invention provides a method and apparatus for fastener hole inspection which determines the fastener hole's profile from timing measurements made during the discharge of plates of a capacitive probe. Because the capacitive probe will not always be exactly centered within the fastener hole being inspected, the present invention provides a centering algorithm to assist in determining the distance from the fastener hole surface to a selected capacitor plate relative to the mathematical center of the hole, thereby eliminating the effects of probe malalignment. Also, a drive circuit is used to guard out or isolate capacitances other than the relatively small capacitance between the selected capacitor plate and the adjacent fastener hole surface.

FIG. 2 is a block diagram of the fastener hole inspection system 10 of the present invention. As shown, the system 10 includes a computer 12 with a visual display or touch screen 14 for command input, a keyboard 16 for data entry, and an optional printer 18. A capacitative probe 20 is connected to computer 12 for use in inspecting a fastener hole 30. A ground cable 32 is used to complete the electrical circuit between a selected plate of the capacitative probe 20 and the fastener hole 30 being inspected so that electrical capacitance can be measured. Optionally, a hand control unit 40 with a plurality of indicator lights 42 and a test button 44 may be connected to computer 12. The purposes of hand control unit 40 are to allow an operator of the fastener hole inspection system 10 of the present invention to remotely select and display the identification number of the fastener hole to be measured, to remotely activate fastener hole inspection, to give the operator a visual indication of the fastener hole condition or quality relative to specified dimensional standards, and to provide error messages should a malfunction in the fastener hole inspection system 10 occur.

FIG. 3 shows a more detailed representation of a preferred capacitive probe 20 for use in connection with the present invention. Capacitive probe 20 has an elongate tubular member or housing 26 formed of a dielectric material. Sensing elements or plates 22 are arranged in housing 26 at six (6) levels along the length of the probe 20. Each level preferably has eight (8) sensing elements 22 arranged ckcnmferentially within the outer surface of the probe 20 for a total of forty-eight (48) sensing elements 22. Housing 26 is connected to a handle 28 and has a step 27 surrounding it at the connection to handle 28. Stop 27 assists in aligning housing 26 within a fastener hole by coming in contact with the surface of the material into which the fastener hole 30 is drilled when probe 20 is inserted into a fastener hole 30. A connector 29 is provided to handle 28 for receiving electrical conductors connected to sensing elements 22 and to electrically connect capacitive probe 20 to computer 12 with reach cable 21. The capacitance measured with probe 20 is related to the distance between a sensing element 22 of the probe 20 and the adjacent surface of the hole 30 as described above with reference to FIG. 1. Thus, capacitance measurements taken with probe 20 may be converted into dimensional data to obtain a profile of the entire hole surface.

FIG. 4 is a functional diagram of electronics unit 50 which is preferrably housed in computer 12. The electronics unit 50 measures the capacitance between each of the forty-eight (48) sensing elements 22 and the wall of a fastener hole 30. As shown, sensing elements 22 are connected to pump circuit 72 through resistors 56 and to select switch 58 through buffers 62. A channel or sensing element 22 selected by select switch 58 is connected to dual threshold window generator 66 and to deselect switch 60 through drive amplifier 64. Theoretically, the equation that describes the signal that is applied to the dual threshold window generator 66 is $Ve^{-(t/rc)}$; where V is the upper threshold potential, t is the elapsed time, r is the charge/discharge resistor 56 of the channel or sensing element 22 being measured, and c is the measured capacitance. The output of drive amplifier 64 is also connected to any conductive components in close proximity to sensing elements 22 such as cable shields 24. The output of dual threshold window generator 66 is fed to counter 68 which, when activated, counts at a frequency determined by multi-frequency clock 70 as instructed by processor 52. Processor 52 is also connected to the hand control unit controller 54, select switch 58, deselect switch 60, and pump circuit 72. All communication to and from the hand control unit 40 is carried out by the hand control unit controller 54 based on commands from processor 52. Processor 52 provides control functions for each of the components of the electronics unit 50, provides precise timing functions required by the present invention, receives commands from the computer 12 and configures the electronics unit 50 accordingly, processes the measurement data, controls the hand control unit 40, and passes the measurement data to the computer 12. A device suitable for use as processor 52 is a Motorola 68632 microprocessor with associated RAM, ROM, and interface circuitry.

As with offer capacitance measurement techniques, a problem arises with the above-described system as a result of the electrical capacitance of circuit components and necessary cabling which contribute significantly to the measured capacitance. Such residual capacitances are so large that they render measurement of values of capacitance in the 0.1 picofarad range impossible. For example, the capacitance contributed by the select switch 58 for a forty-eight (48) channel system is approximately 300 picofarads. The capacitance contributed by a cable 21 (connecting capacitive probe 20 to computer 12) when made of standard 26 AWG wire is approximately 150 picofarads per foot. In addition to the bias caused by cable 21, fluxuations in capacitance may occur when cable 21 is flexed. This relative motion between the conductors of cable 21 makes the large 150 picofarad per foot an unreliable value of base capacitance to be subtracted from the total measured capacitance in an effort to obtain more accurate capacitance measurements. Thus, for a capacitance measuring system with a modest cable length of 10 feet and counting (as the present invention preferably does) at 457 counts per picofarad, the value of count that would be associated with cable 21 and analog switch 58 alone would be 822,600 counts. Such a system would require that counter 58 be a 20-bit counter, the major portion of which would be used to count residual capacitances. Again, this residual value of capacitance is not constant since cable 21 would likely be flexed causing the relative capacitance to vary. Furthermore, the capacitance that the analog select switch 58 contributes is a function of temperature and, as a result, is also variable. Thus, the preferred way to measure a very mall capacitance, when large and changing residual capacitances exist is to, in effect, eliminate or greatly reduce the effects that the residual capacitances have. This is the approach used by the present invention In accordance with one aspect of the present invention the residual capacitive effects of select switch 58 are eliminated by buffering the signal using channel buffers 62. Using this technique, the residual capacitive effects of circuit components are reduced to the effects caused by the input capacitance of the channel buffer 62 (nominally 5.5 picofarads) plus the effects of one source to gate capacitance contributed by the deselect switch 60 (nominally 7 picofarad). This total of 12.5 picofarads is significantly lower than the 300 picofarads that would be experienced without using the channel buffering technique of the present invention.

In addition to this channel buffering technique, another aspect of the present invention uses signal following to reduce the effects of circuit board and connector cable capacitance such as that contributed by cable shields 24. This technique is accomplished using the drive amplifier 64 and the deselect switch 60. Drive amplifier 64 has a gain of unity, and "follows" the voltage applied to a selected plate or sensor element 22. The output of drive amplifier 64 is switched to all of the unchosen channels or sensor elements 22 by the deselect switch 60 causing them to be driven at the same potential as the selected plate or sensor element 22. The output of the drive amplifier 64 is also connected to circuit board guards (not shown), cable shields 24 and, in general, any conductive body that is in close enough proximity to the selected channel or any of its associated components to contribute a residual capacitance. Since transient current i=c (dv/dt), and the effect of driving one component relative to another is to make the "dv/dt" term go to zero, the result of the signal following or driving technique of the present invention is to make the transient current i=0 and therefore eliminate the effects of associated residual capacitances.

For a prototype of the present invention as depicted in FIGS. 2–4, it has been determined that the residual capacitance due to electronics is a mere 11.4 picofarads when the features of the present invention are used. When a six foot cable 21 is added the capacitance rises to 12.0 picofarads and with a 22 foot cable 21, the capacitance is 13.6 picofarads. The total capacitance when using a 10 foot cable 21 is approximately 13.2 picofarads. Counting at a rate of 457 counts per picofarad results in a bias of approximately 6,000 counts, compared to the above-mentioned 822,600 counts without use of the features of the present invention and requiring a 20-bit counter. By contrast, when features of the present invention are used, a 16-bit counter having a range of 65,536 counts is adequate. With this bias of 6,000 counts there is still plenty of counter capacity left to measure even relatively large capacitances.

Another aspect of the present invention relates to the analog to digital converting element embodied in the dual threshold window generator 66. Some capacitance measuring system may attempt to address a channel, set a level on the nonaddressed channels, reset the counter, start the counter running and start the pump circuit all with one processor signal defined as t=0. In the present invention, all of the resetting and addressing is preferrably carded out by individual processor driven events at some time, t, where t<0. After sufficient settling time the next event would be to start the pump circuit at a time that is still defined by t<0. The reason that this time is not a good time to start the counter is that there is enough inductance in the system to cause the signal to resist the "step" signal. Allowing a slight amount of time after this event allows the discharge signal to settle into a true RC exponential decay. In accordance with the present invention, this delay is accomplished by using two thresholds to define the count window. When the discharge signal falls to the upper threshold, the dual threshold window generator 66 enables the counter 68 defining the time as t=0. When the signal falls further to the lower threshold, the dual threshold window generator 66 disables the counter 68. The count that the counter 68 accumulates during the intervening time interval allows one to obtain a stable measurement of the capacitance between a selected capacitance plate or sensor element 22 of probe 20 and the adjacent surface of fastener hole 30.

The basic principles of the centering algorithm used in connection with the present invention are described in the paper "Design of Algorithms to Extract Data from Capacitance Sensors to Measure Fastener Hole Profiles" by Joseph L. Hammond, Jr. and Samuel Ray Glidewell, IEEE Transactions on Instrumentation and Measurement, Vol. IM-32, No. 2, pp. 343-349, June 1983, which paper is incorporated herein by reference. However, as used in connection with the present invention, three significant improvements have been made to the algorithm to extract data from capacitance sensors to measure fastener hole profiles. For the centering algorithm described by Hammond and Glidewell, the quantity K(l,m) depends not only on the area of probe segment (l,m), but also on b, the radius of the hole being measured. In the algorithm of the present invention, K(l,m) is denoted by $K_b(l,m)$ to show the dependence of $K_b(l,m)$ on the radius of the bole under test. In the previous version of the algorithm the values of $K_g(l,m)$, which correspond to the small calibration hole, are used in the algorithm for estimating hole profile parameters for measured holes. Both the calibration algorithm and the algorithm for processing data from a hole under test have been modified to take into account the fact that the radius of the hole under test is different from the radius of the small calibration hole.

The second modification of the algorithm allows clock counts to be used instead of capacitance. C(l,m) is written as T(l,m)/γ(l,m), where T(l,m) are clock counts and γ(l,m) are counts/pf. The γ(l,m) term is included in $K_b(l,m)$ so that C(l,m) is replaced by T(l,m) in the algorithm equations. The probe calibration parameters $K_g(l,m)$, where R is the radius of the small calibration hole, depend on the characteristics of the circuits for capacitance measurement, so that a probe must be recalibrated flit is used with another measurement system. Probe recalibration is much easier however than trying to maintain a capacitance standard with which the instrumentation for capacitance measurement can be calibrated.

Finally, an iteration scheme is added to the algorithm which improves the accuracy of the probe calibration and hole measurements. A novel and unique aspect of the scheme used is that it always converges after two iterations, which allows the total time required for the iteration process to be known.

On power up of computer 12, the processor 52 configures the various components of the electronics unit 50 to a startup, default state. This "default" state can be changed to some extent on command from the computer 12. From this state the processor 52 awaits instructions from the computer 12. If a configuration other than default is needed to measure a value of electrical capacitance that falls out of the optimized "standard" range, the processor 52 (under command from the computer 12) can change the frequency of the counter clock 70 to a lower value. (The preferred default value is 40 Megahertz.) Lowering the frequency would be needed if a larger than usual electrical capacitance is to be measured. If this value of capacitance is sufficiently large, then the period between each measurement may need to be lengthened tom the default value. This ability to lengthen the measurement period is also under control of the processor 52. Another configuration variable pertains to the area of the data type that will be sent from the processor 52 to the computer 12. The processor 52 under command from the computer 12 will send back either a single reading per channel, an average of multiple readings per channel, or an average of multiple readings per channel after statistical processing has been used to remove any extraneous data points.

Figures 8, 9:
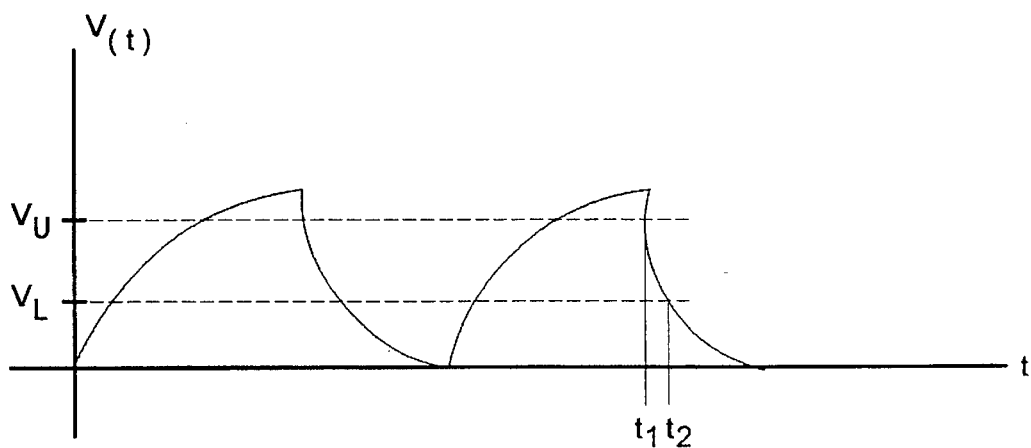
FIG. 8 is a display of fastener hole measurement data obtained with the system of the present invention.
FIG. 9 is a graph showing a representative voltage discharge waveform used to obtain capacitance measurements with the system of the present invention.

To inspect a fastener hole 30 with the system 10 of the present invention, simply insert the probe 20 into the hole 30 and press and release the test button 42 on the hand control unit 40. The system 10 takes about three seconds to inspect a hole. The results may be displayed on the hand control unit 40 with, for example, red (BAD/FAIL) and green (GOOD/PASS) indicator lights 42. If for some reason the reading is incomplete, a yellow light may be used to indicate that a RE-TEST is needed. To accomplish this, one simply presses the test button 42 again. The results of the hole measurements are also displayed on the touch screen 14 with a good, bad; oversize, bad: undersize indication. Advantageously, the measurement data may be automatically saved to the computer's 12 hard disk. An example of a recorded hole measurement is shown in FIG. 8.

The data acquisition function is detailed as follows. On command from the computer 12, the processor 52 resets the counter 68. The select switch 58 and the deselect switch 60 are both addressed to a predescribed channel or sensor element 22. The purpose of the select switch 58 is to select the channel to be measured and connect it to the dual threshold window generator 66, which is an analog-to-digital element. The purpose of the deselect switch 60 is to hold all of the channels that are not being measured to the same potential as the measured signal by driving them with a low impedance representation of the measured signal After the time for the addressed parts to stabilize has transpired, the processor 52 sends a signal to the low impedance pump circuit 72 that enables the capacitance of the selected channel to charge. At this time, the other channels (not selected) follow the charging signal. The charging time is preferably set to be ten times the largest capacitor, C, that is measurable in the given system configuration, multiplied by the charge/discharge resistor 56 value, R. After this time of 10 RC, the processor 52 reverses the signal to the low impedance pump circuit 72 which places zero volts at less than one ohm onto the charge/discharge resistors 56, beginning the discharge cycle. The voltage at the selected sensor element 22 and subsequently at the input to the dual threshold window generator 66 is then, theoretically, the simple RC discharge curve of the selected capacitance through the selected charge/discharge resistor 56 as depicted in FIG. 9. When the signal at the input of the dual threshold window generator 66 has fallen to the upper threshold, $V_u$, then the counter 68 is enabled and begins to count at the pulses that are presented to it by the multifrequency clock generator 70. When the signal fails further to the lower threshold, $V_L$, then the dual threshold window generator 66 disables the counter 68. The processor 52 waits until the time to measure the largest measurable capacitance of the configuration is reached and then disables the counter 68. The processor 52 then reads the counter 68 on a 16-bit data bus. The processor 52 then selects the next channel to be measured and the sequence of operation is repeated. The processor 52 will perform this operation as many times as dictated by the selected configuration sequence, average or statistically analyze the data as dictated by the selected configuration sequence and then transfer the data to the computer 12.

Figure 5:
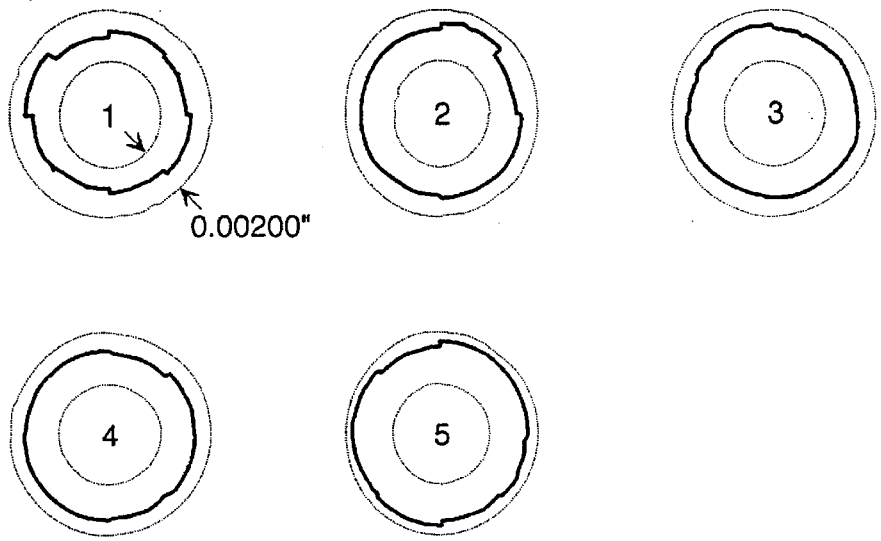
FIG. 5 and FIG. 5A are plots of measurements taken with the system of the present invention presented as horizontal, cross-sectional slices taken at various levels along the length of a fastener hole.
Figure 5A:
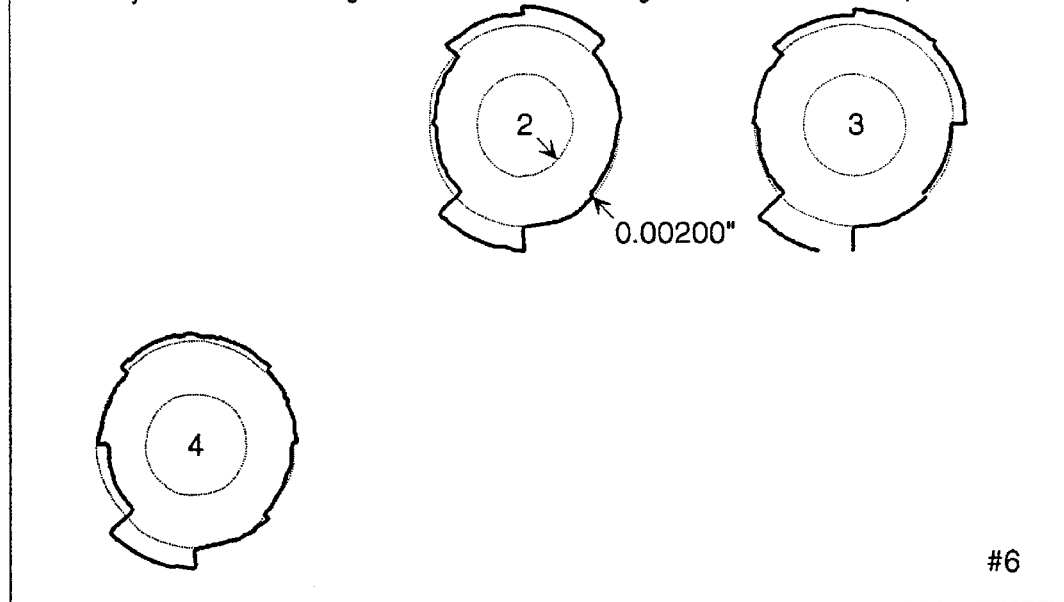
Figure 6:
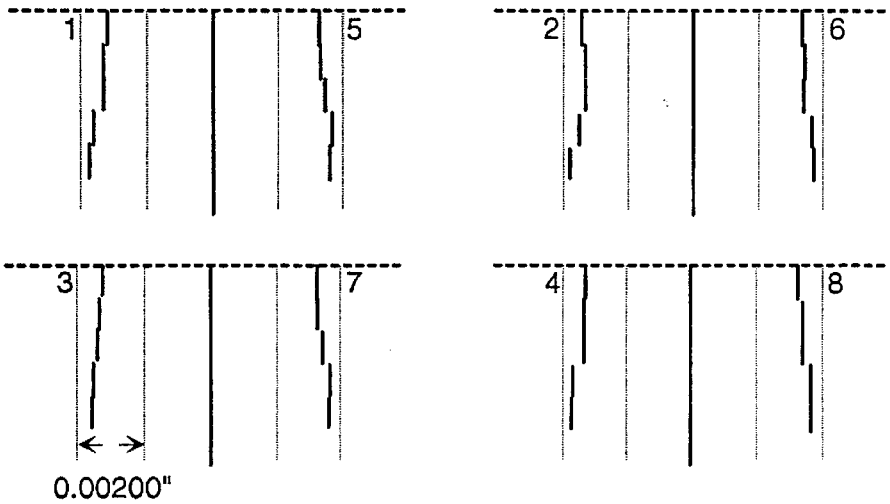
FIG. 6 and FIG. 6A are plots of measurements taken with the system of the present invention presented as vertical, cross-sectional slices taken at various angles around the circumference of a fastener hole.
Figure 6A:
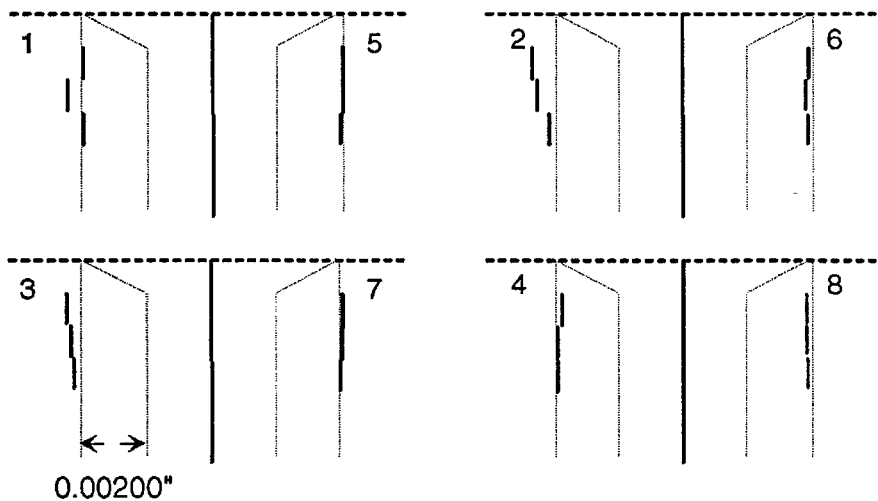
Figure 7:
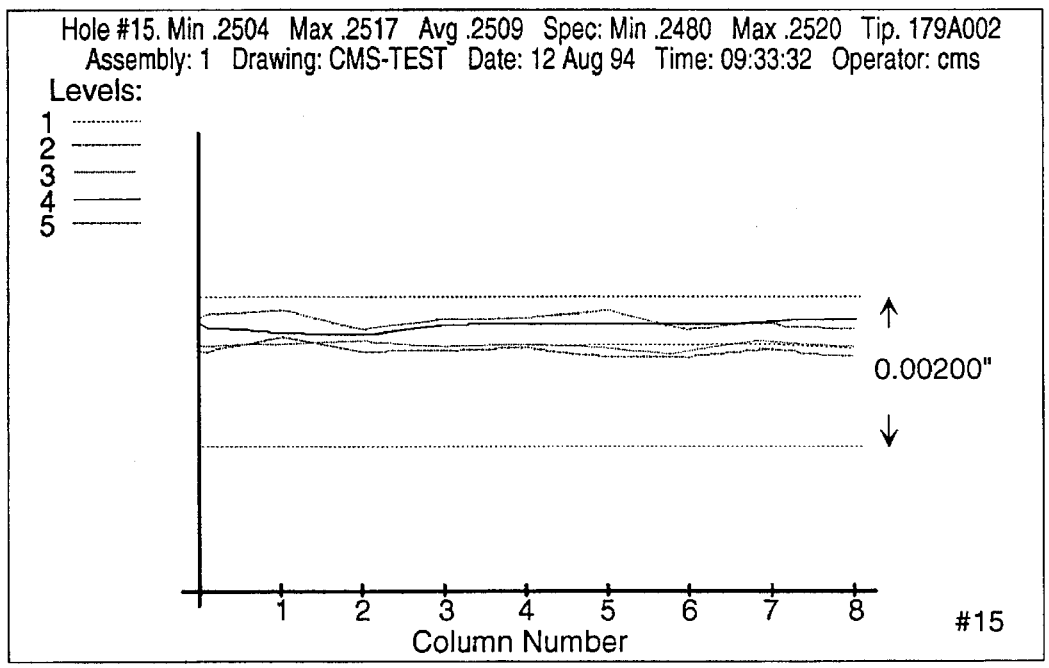
FIG. 7 and FIG. 7A are plots of measurements taken with the system of the present invention presented in linear form depicting one level along the length of a fastener hole.
Figure 7A:
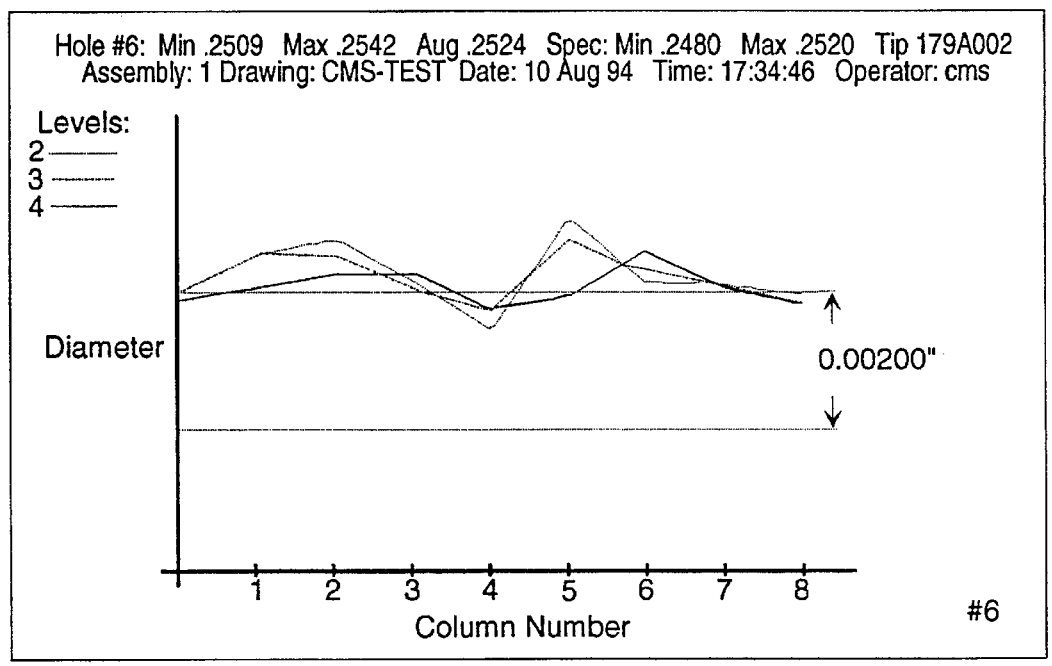

The results of the measurements taken with fie system of the present invention may be illustrated graphically as shown in FIGS. 5–7. FIG. 5 presents the measurements taken with the system of the present invention as horizontal, cross-sectional plots or "slices". The slices are from the top to the bottom of the hole. The slices are labeled at the center by the corresponding level of plates on the probe. In the preferred embodiment, up to six (6) levels can be displayed depending on the depth (grip length) of the hole. In FIG. 5, five (5) levels are shown. The minimum and maximum acceptable limits are shown as dashed circles at each level. The measurement of the hole is presented as a solid line. Ideally, the hole measurement line will be between the minimum and maximum circles, but it can also be presented inside or outside these limits if a hole is undersize or oversize as shown in FIG. 5a. At each level on a probe there are eight plates arranged circumferentially. In the circle plot, the measurement obtained by each plate is shown as a constant diameter over a 45 degree section of the "hole slice". The shape of the hole at a given depth can be inferred by looking at the individual hole slices. Ovality and roundness can be observed in this manner. Looking at the shape of the hole from level to level helps to quickly qualify barreling or bellmouthing in the drilling process.

FIG. 6 shows a cross section plot. This graphical format presents the measurement as "sections". The sections are obtained by cutting the hole from top to bottom at the 0–180 degree, 45–225 degree, 90–270 degree, and 135–305 degree vertical axes. These four sections are displayed with the centerline of the hole and the minimum and maximum acceptable dimensions. The hole measurement is presented as a solid line. The top of each section is the top of the material stack. The bottom of each section is the bottom of the probe itself. If the material thickness is smaller than the probe length, only the probe levels used for measurement are shown. The numbers shown at the top of each section indicate the opposing plates at each levee For instance, the 1 and 4 in the upper right section indicate that capacitor plates at "column numbers" 1 and 4 are the sensing elements. This display format is useful to infer the straightness of a drilled hole.

FIG. 7 shows a linear plot. This graphical format presents the measurement, at each level, as if the hole were rolled out flat. The x-axis is the linear distance going around the circumference of the hole. The x-axis is labeled from 1 to 8 for each of the plates at each level of the probe. The y-axis shows tolerance as well as diameter. There is a trace indicating the shape of the hole at each probe level within the material stack. Different line types (dashed, dotted, etc.) may be used for the different levels. This display format is useful for inferring the roundness or ovality of a hole. If the hole is perfectly round, the shape of the trace for each level will be perfectly flat. A trace with a peak and trough (maximum and minimum) indicates a hole that is oval.

Although the invention has been described with reference to a preferred embodiment thereof, it is to be understood that this embodiment is merely illustrative oft he application of the principles of the invention. Numerous modifications may be made therein without departing from the scope and spirit of the invention as set forth in the following claims.

What is claimed is:

1. An apparatus for inspecting the surface of a fastener hole for compliance with specified dimensional standards, comprising:

(a) a capacitive probe having a tubular, dielectric housing with a plurality of sensor elements arranged circumferentially within the housing at one or more levels for insertion into the fastener hole;

(b) means for grounding the fastener hole;

(c) an electronics unit electrically connected to said probe, said electronics unit comprising (i) a select switch for sequentially selecting one of said plurality of sensor elements thereby defining a selected sensor element and a plurality of deselected sensor elements, said select switch having an input and an output, (ii) a deselect switch having an input and an output, the output being connected to said plurality of deselected sensor elements, (iii) voltage generation means for momentarily charging said selected sensor element with a charging voltage whereby a capacitance is developed between the fastener hole and said selected sensor element, (iv) a resistor electrically connected between said selected sensor element and said voltage generation means, (v) a dual threshold window generator electrically connected to the output of said select switch for monitoring a signal representing the charging voltage applied to said selected sensor element, (vi) counting means electrically connected to said dual threshold window generator for counting the time required for the charging voltage to decay from a first predetermined voltage level to a second predetermined voltage level, (vii) a drive amplifier electrically connected to the output of said select switch for applying the signal representing the charging voltage to the input of said deselect switch and to adjacent electrically conductive components, (viii) a first buffer electrically connected between said selected sensor element and said select switch, and (ix) processor means connected to said select switch, said deselect switch, said voltage generation means, and said counting means for determining the capacitance and distance between said selected sensor element and the surface of the fastener hole whereby compliance of the surface of the fastener hole with specified dimensional standards may be evaluated; and (d) a data storage, processing, and retrieval means electrically connected to said processor.

2. The apparatus as recited in claim 1, further comprising a hand controlled unit controller connected to said processor means and a hand control unit connected to said hand control unit controller for remote activation of fastener hole inspection with said capactive probe and for providing a visual indication of the results of the fastener hole inspection relative to the specified dimensional standards.

3. The apparatus as recited in claim 1, further comprising a keyboard connected to said data storage, processing, and retrieval means for data entry.

4. The apparatus as recited in claim 1 wherein said data storage, processing, and retrieval means includes a touch screen for inputting commands.

5. The apparatus as recited in claim 1, further comprising a printer connected to said data storage, processing, and retrieval means.

6. The apparatus as recited in claim 1 wherein the specified dimensional standards comprise maximum and minimum values corresponding to each of said capacitor levels and wherein said computer further comprises display means for presenting a graphical representation of the degree of compliance of the distance values of the fastener hole with maximum and minimum values at each level.

* * * * *